(12) United States Patent
Valle

(10) Patent No.: US 7,491,143 B2
(45) Date of Patent: *Feb. 17, 2009

(54) SPROCKET OF A CHAIN TRANSMISSION FOR A BICYCLE

(75) Inventor: Maurizio Valle, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/840,640

(22) Filed: Aug. 17, 2007

(65) Prior Publication Data

US 2008/0020880 A1 Jan. 24, 2008

Related U.S. Application Data

(63) Continuation of application No. 10/427,600, filed on Apr. 30, 2003, now Pat. No. 7,258,638.

(30) Foreign Application Priority Data

Apr. 30, 2002 (EP) .................................. 02425275

(51) Int. Cl.
F16H 55/12 (2006.01)
F16H 55/36 (2006.01)
(52) U.S. Cl. .................. 474/160; 474/152; 474/158
(58) Field of Classification Search .................. 474/70, 474/148, 160–162, 152–156, 158
See application file for complete search history.

(56) References Cited

U.S. PATENT DOCUMENTS

| 4,181,033 | A | 1/1980 | Nagano |
| 4,268,259 | A | 5/1981 | Segawa et al. |
| 4,392,841 | A | 7/1983 | Juy |
| 4,867,733 | A | * | 9/1989 | Yamanoi et al. ............ 474/161 |
| 5,299,925 | A | | 4/1994 | Chang |
| 5,464,373 | A | | 11/1995 | Leng |
| 5,503,598 | A | | 4/1996 | Neuer et al. |
| 5,545,096 | A | * | 8/1996 | Su .............................. 474/160 |
| 5,609,536 | A | | 3/1997 | Hsu |
| 5,716,297 | A | | 2/1998 | Bodmer |
| 5,738,603 | A | | 4/1998 | Schmidt et al. |
| 6,007,442 | A | | 12/1999 | Schmidt |
| 6,045,472 | A | | 4/2000 | Sung et al. |
| 6,666,786 | B2 | | 12/2003 | Yahata |

FOREIGN PATENT DOCUMENTS

DE 29610398 U1 8/1996

(Continued)

*Primary Examiner*—Marcus Charles
(74) *Attorney, Agent, or Firm*—Volpe and Koenig, P.C.

(57) ABSTRACT

A sprocket of a chain transmission for a bicycle is described, intended to be coupled with a further sprocket with a smaller diameter in a group of sprockets integral in rotation. The sprocket comprises a plurality of teeth which follow each other on the sprocket separated by spaces according to a direction of rotation of the sprocket, in which each tooth has a thickness, a width and a height and has a lead side, a following side, a front side and a rear side. The sprocket has a front bevel on at least one tooth of first disengagement of the plurality of teeth and a rear bevel on at least one tooth of last engagement of said plurality of teeth.

19 Claims, 7 Drawing Sheets

FOREIGN PATENT DOCUMENTS

| | | |
|---|---|---|
| EP | 510361 A1 | 10/1992 |
| EP | 0856461 A1 | 8/1998 |
| EP | 1167174 A2 | 1/2002 |
| EP | 1219533 A2 | 7/2002 |
| FR | 2707586 A1 | 1/1995 |
| JP | 03-125685 A | 5/1991 |
| JP | 04-126692 A | 4/1992 |

* cited by examiner

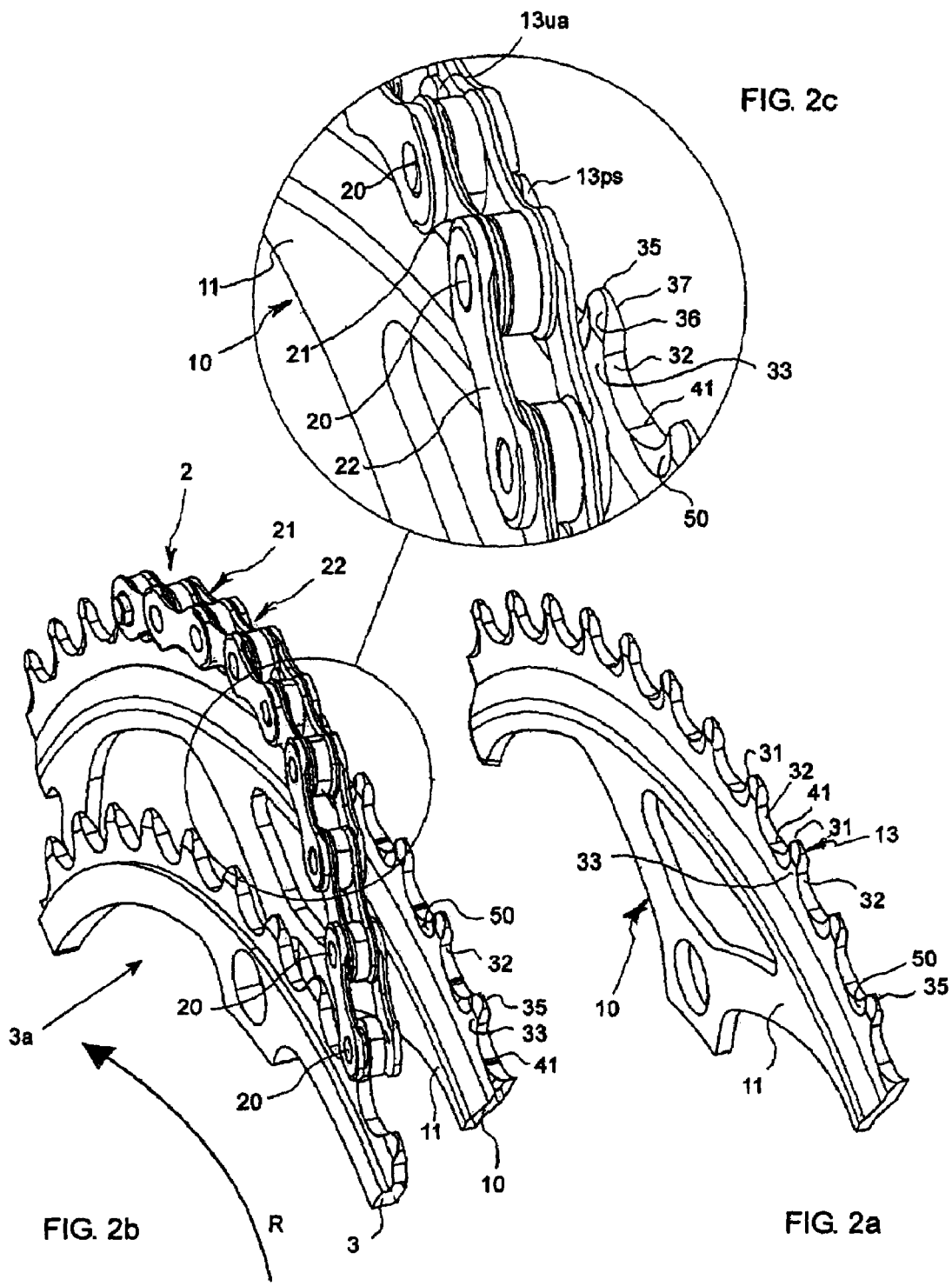

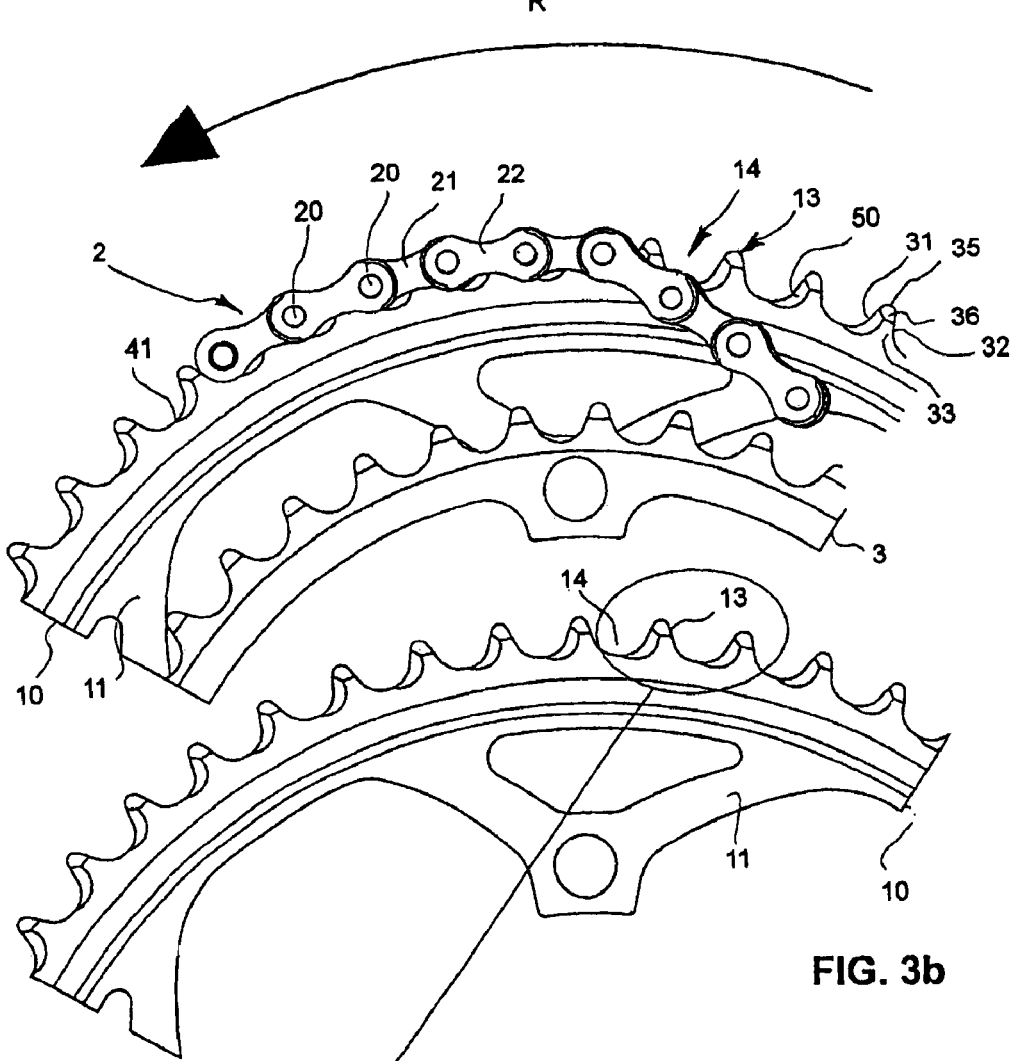
FIG. 3a
FIG. 3b
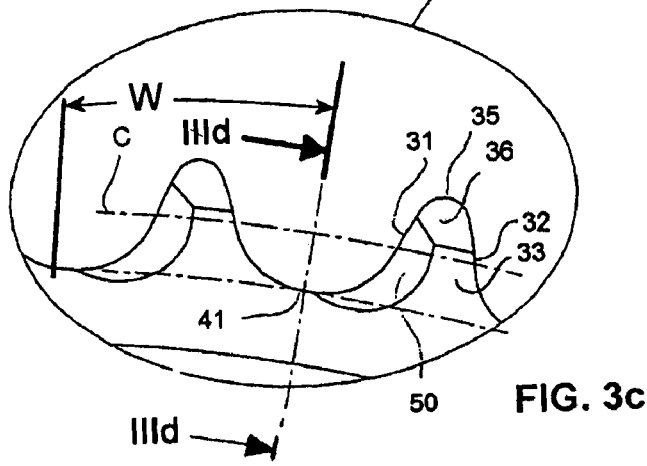
FIG. 3c
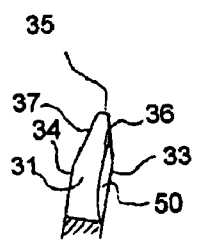
FIG. 3d

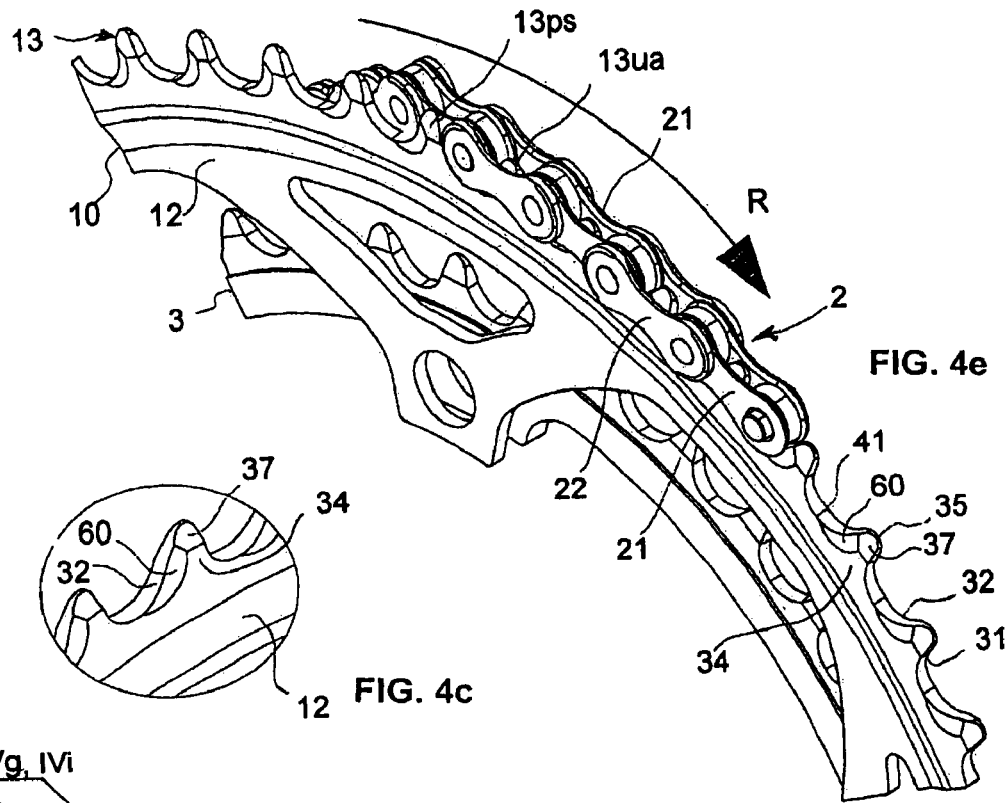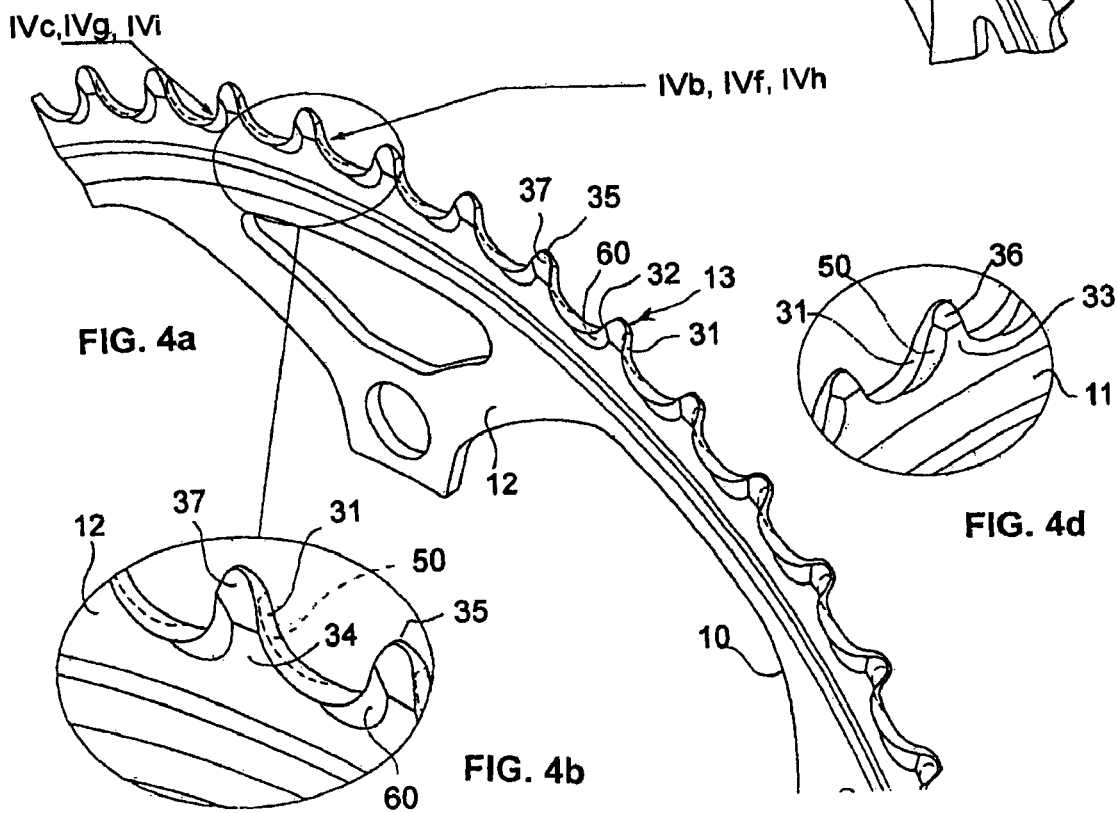

SPROCKET OF A CHAIN TRANSMISSION FOR A BICYCLE

CROSS REFERENCE TO RELATED APPLICATION

This application is a continuation of U.S. patent application Ser. No. 10/427,600, filed Apr. 30, 2003, which issued as U.S. Pat. No. 7,258,638, which is incorporated by reference as if fully set forth.

FIELD OF INVENTION

The present invention refers to a sprocket that forms part of a bicycle chain transmission. By the term sprocket is meant a sprocket or gear having a crown or ring of teeth. The invention applies to both a front or rear gear-shift group. Hereafter, the term "gear-shift," unless further specified means either a rear or a front gear-shift.

BACKGROUND

As it is known, bicycle gear-shifts are generally comprised of a group of sprockets of different diameters, mounted integral in rotation with each other. A drive chain engages a sprocket from the group according to the desired transmission ratio. Each sprocket has a plurality of teeth which follow one another at a set distance or pitch from each other. The pitch is the same on the various sprockets of the same group and corresponds to the pitch of the chain.

It should be noted that on a bicycle the motion transmission always takes place in the same direction, i.e. the chain always moves in the same direction (at least when it transmits power), and therefore the sprockets always rotate in the same direction, that is the teeth advancement direction. With reference to such a direction of rotation, each tooth has a lead side (the one facing forwards with respect to the direction of rotation) and a following side (the one facing backwards). In the sprockets of a front gear-shift group, the lead side of the tooth is the pressure side, that is the one which exerts the traction force on the chain; in the sprockets of a rear gear-shift group, the pressure side is, by contrast, the following side, upon which the traction force exerted by the chain acts. Each tooth also has an extension in the circumferential direction, or width, an extension in the radial direction, or height, and an extension in the axial direction, or thickness.

The displacement of the engagement of the chain from one sprocket to another is known as a gear-change. It is usually obtained by displacing the chain transversally with respect to its own longitudinal axis (that is axially with respect to the crown of teeth), until it is disengaged from one sprocket and engaged with the adjacent sprocket. Such a displacement action is usually obtained by chain-guide devices, mounted immediately upstream of the sprockets with reference to the motion direction of the chain. Devices of different types exist, both for front and rear gear-shifts.

If the gear-change is from a larger diameter sprocket to a smaller one, it is said to be a "downwards gear-change"; if vice-versa from a smaller to a larger diameter, it is said to be an "upwards gear-change." It should be noted that on the front gear-shift a downwards gear-change involves a reduction in the transmission ratio, whereas on the rear gear-shift a downwards gear-change involves an increase in the transmission ratio.

The gear-change, both upwards and downwards, is in any case a delicate operation, since it takes place with the chain taut and since the chain has a very limited deformability in the transversal direction (with respect to its own longitudinal axis); the delicateness is usually greater on the front gear-shift, where the differences in diameter between adjacent sprockets are greater.

In particular, during a downwards gear-change, the chain must be disengaged from the larger sprocket and deviated towards a smaller one. Whilst it is not usually difficult to make the chain reach the small sprocket (the tension of the chain helps this), it is, however, difficult to disengage the chain from the larger sprocket. Since the chain portion to be deviated is the taut one, a substantial transversal thrusting stress is needed to be able to disengage the chain from the larger sprocket. If the necessary stress is not applied, the gear-change is denied, that is it does not take place.

Also, sometimes on the front gear-shift group it may happen that during the gear-change the chain engages with the small sprocket without however managing to disengage from the large sprocket. This can happen if, by chance, the distance (in the deviated direction which the chain takes up during the gear-change) between the last engaged tooth of the large sprocket and the first engaged tooth of the small sprocket is equal to a whole multiple of the pitch. If this happens, there is not a simple denial of the gear-change, but rather the so-called "chain eddy", i.e. the chain gets tangled on the two sprockets and the gear-shift is clearly blocked.

SUMMARY

The problem addressed by the present invention is that of easing the downwards gear-change.

Such a problem is solved by a sprocket of a chain transmission for a bicycle, intended to be coupled with a further sprocket with a smaller diameter in a group of sprockets integral in rotation, comprising a plurality of teeth which follow each other on the sprocket separated by spaces according to a direction of rotation of the sprocket, in which each tooth has a thickness, a width and a height and presents a lead side, a following side, a front side and a rear side, characterised in that it comprises at least one among:

a front bevel on at least one tooth of first disengagement of said plurality of teeth, such a bevel extending between the front side and the lead side;

a rear bevel on at least one tooth of last engagement of said plurality of teeth, such a bevel extending between the rear side and the following side.

By bevel is meant a surface which defines a portion of tooth which is lacking with respect to a normal ideal volume, directed obliquely with respect to both the adjacent surfaces of the tooth upon which it extends (front side and lead side for the front bevel, rear side and following side for the rear bevel) so as to constitute an ideal transition surface between the two adjacent surfaces. Such a surface can be considered to be obtained by physically cutting away part of the material, but can also be practically obtained in other ways.

The presence of the front bevel makes it easier to disengage the chain from the sprocket by such a tooth of first disengagement, because it reduces the interference between the chain in deviated position and the tooth. In other words, the outer side of the chain links finds in the bevel the space it needs to correctly take up the position deviated towards the other sprocket with a smaller diameter.

An analogous effect is obtained by the rear bevel, which allows a greater deviation of the chain right from the tooth of last engagement; therefore the interference between the chain and the front side of the tooth of first disengagement is lower.

Preferably, the front bevel and/or the rear bevel have a surface substantially parallel to the longitudinal axis of a bicycle chain which is passing from engagement with the larger diameter sprocket to engagement with the smaller diameter sprocket and which is still engaged with the sprocket on the tooth of last engagement but no longer on the tooth of first disengagement.

Indeed, if the presence of a bevel is advantageous, a bevel directed just like the chain is directed during the passage from the larger sprocket to the smaller one gives a better result, because it only denies the tooth of the material which hinders the downwards gear-change.

Both the front and the rear bevels can extend onto just the tooth upon which they are formed, or else advantageously extend even beyond, in the circumferential and/or radial direction, in the radial direction continuing up to the base of the adjacent space or even beyond, and in the circumferential direction up to the middle point of the adjacent space or even beyond. The extension beyond the tooth is particularly advantageous for the front bevel, by which the chain can lower a lot, but it is also very advantageous for the rear bevel, since the chain links extend in the radial direction beyond the diameter of the pins.

Both the front and the rear bevels can have different shapes. In a preferred embodiment they have a curvilinear progression, their surface being substantially cylindrical; this embodiment is preferred to maximise the construction simplicity. In another preferred embodiment, they have a linear progression with a joint, their surface having a peripheral portion (i.e. towards the periphery of the sprocket) which is substantially flat and a jointing inner portion (i.e. towards the centre of the sprocket); this embodiment is preferred for maximising the functionality of the bevel.

Both the front and the rear bevels can extend more or less on the tooth upon which they are formed, in width, in thickness and in height.

The width extension is preferably equal to at least half the width of the tooth, more preferably equal to the entire width of the tooth. The thickness extension is preferably less than 70% of the thickness of the tooth, more preferably equal to 20-40% of the thickness of the tooth. The height extension is preferably equal to at least half the height of the tooth, more preferably it gets up to the usual upper triangular bevel with which the teeth of a similar sprocket are provided.

A sprocket can be provided with one or more teeth of first disengagement, provided with a front bevel, and/or one or more teeth of last engagement, provided with a rear bevel.

For a sprocket of a front gear-shift, it is preferable to have a predetermined number of teeth provided with a front and/or rear bevel. In this way, the downwards gear-change will take place by such teeth. Therefore, advantageously, the localisation of such teeth along the circumference of the sprocket shall be linked to the geometry of the coupled sprocket with a smaller diameter and to its angular arrangement. In particular, the localisation of the aforementioned special teeth shall be such as to avoid the geometric conditions illustrated at the beginning, in which the distance (in the deviated direction which the chain takes up during the gear-change) between the last engaged tooth of the large sprocket and the first engaged tooth of the small sprocket is equal to a whole multiple of the pitch.

Moreover, it is also preferable that all teeth of the sprocket be provided with a front bevel, or with a rear bevel or even more preferably with both. This allows both to ease the downwards gear-change in any angular position of the sprocket, and to simplify the production of the sprocket.

In the case in which there are more teeth with a front bevel, it is preferable that the front bevels are the same as each other, just as in the case in which there are many teeth with a rear bevel, it is preferable that the rear bevels are the same as each other.

In the case in which there are both teeth with a front bevel and teeth with a rear bevel, preferably the front bevels are the same or extends further than the rear bevels. The embodiment in which the front bevels extend further than the rear ones is the preferred one from the functional point of view, since it satisfies with greater precision the requirement of non-interference between the parts during the downwards gear-change. The embodiment in which the front bevels are the same as the rear ones is the preferred one from the production point of view, because it simplifies the construction of the sprocket.

BRIEF DESCRIPTION OF THE DRAWING(S)

Further characteristics and advantages of a sprocket according to the invention shall become clearer from the following description of one of its preferred embodiments, made with reference to the attached drawings. In such drawings:

FIG. 2a is a front perspective view of section of the sprocket of FIG. 1;

FIG. 2b illustrates the sprocket of FIG. 2a paired with a smaller diameter sprocket and part of a chain in transition from the larger to the smaller sprocket;

FIG. 2c is an enlarged view of a detail of FIG. 2b;

FIG. 3a is a plan view in the direction of 3a of FIG. 2b;

FIG. 3b is a perspective of a part of the larger sprocket of FIG. 2a;

FIG. 3c is an enlarged view of a detail of FIG. 3b;

FIG. 3d is a section view carried out along the line IIId-IIId of FIG. 3c;

FIG. 4a is a rear perspective view of a section of the sprocket of FIG. 1;

FIG. 4b is an enlarged view of a detail of FIG. 4a;

FIG. 4c is an enlarged view of a detail of FIG. 4a, taken from the point of view of the arrow IVc, IVg;

FIG. 4d is an enlarged view of a detail of FIG. 4a, taken from the point of view of the arrow IVd, IVf;

FIG. 4e illustrates the sprocket of FIG. 4a paired with a smaller diameter sprocket and part of a chain in transition from the larger diameter to the smaller diameter sprocket;

FIG. 5a is a top plan view of the sprocket of FIG. 1;

FIG. 5b is an enlarged view of a detail of FIG. 5a;

FIG. 5c is a top plan view of the sprocket of FIG. 5a paired with a smaller diameter sprocket and part of a chain in transition from the larger sprocket to the smaller one.

DETAILED DESCRIPTION OF THE PREFERRED EMBODIMENT(S)

Figure 1:
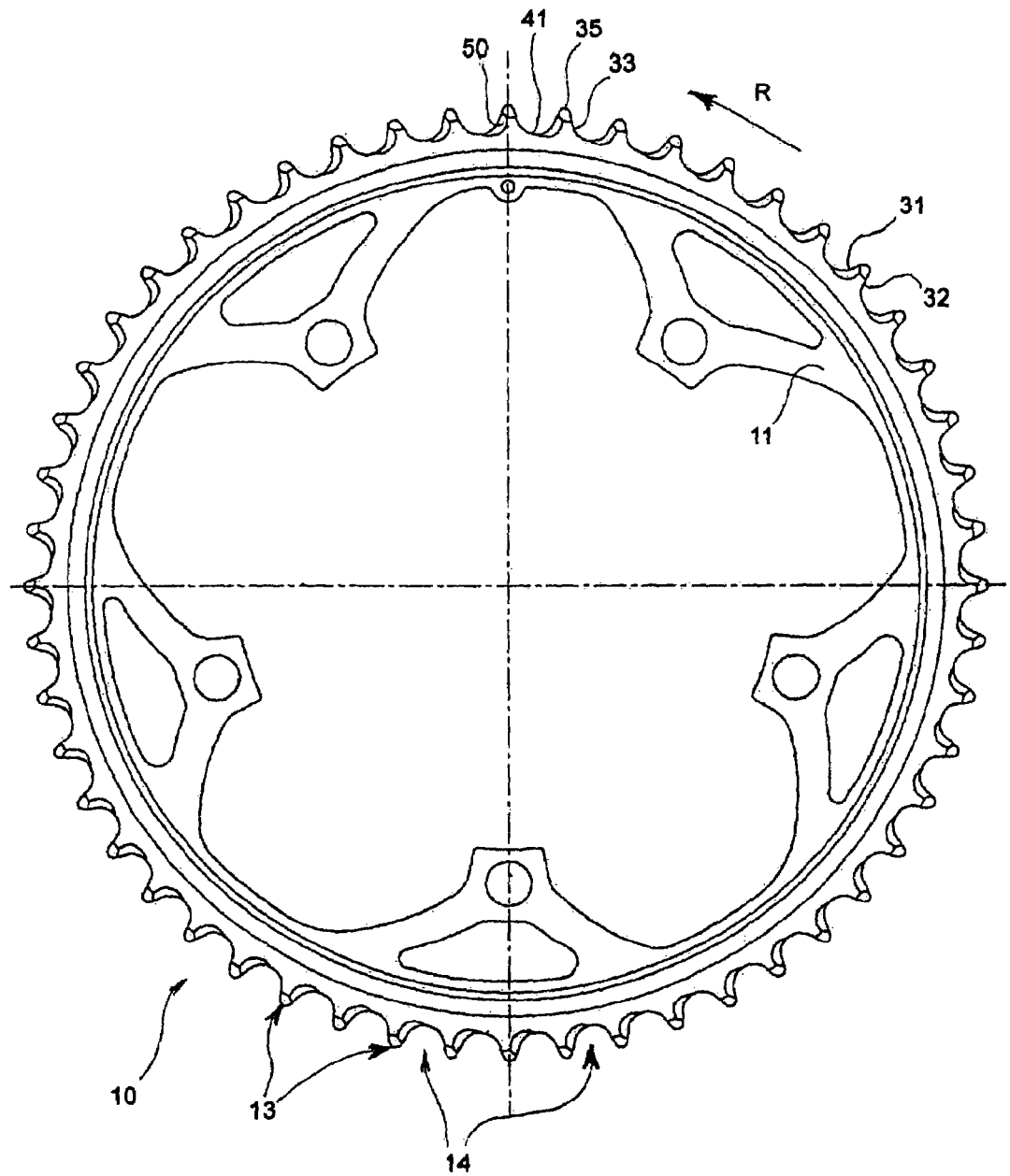
FIG. 1 is a front view of a sprocket according to the invention.

In the figures, the sprocket 10 according to the invention is illustrated as the toothed crown gear of a bicycle chain transmission.

Portions of a chain 2, see FIG. 2b, as would engage with the sprocket 10 are illustrated in some of the figures. The chain 2 comprises a succession of pins 20, spaced by a predetermined pitch and connected to each other in succession by links, outer links 21 and inner links 22 alternately, along a chain axis C, see FIG. 5c. As is well known, every link 21 or 22 can freely rotate with respect to the pins 20 to which it is connected, whereas it can only flex to a limited extent with respect to the axis C.

The sprocket 10 has a precise direction of rotation, indicated in the figures by the arrow R, in the sense that the sprocket 10 transmits power when it rotates in the direction of rotation R. The sprocket 10 can usually rotate in the opposite direction, but it typically does not transmit power because power transmission in a bicycle transmission normally takes place in only one direction.

The larger diameter sprocket 10 is intended in use to be coupled or paired with a smaller diameter sprocket 3 within a group of sprockets in a rotation. The smaller diameter sprocket 3 may be a conventional sprocket or a sprocket according to the invention. For simplicity of explanation herein, the sprocket 3 shall be considered to be of the conventional type and shall not be described any further.

The sprocket 10 of FIG. 1 has a front face 11, generally facing towards the smaller diameter sprocket 3, see FIG. 2b, and a rear face 12, opposite face 11, and a plurality of teeth 13, arranged along the periphery or crown of the sprocket 10. Teeth 13 are separated by spaces 14 and have a predetermined pitch equal to the pitch of the chain 2 for which the sprocket 10 cooperates.

Each tooth 13 comprises a lead side 31, FIGS. 1, and 3a-3d, facing forwards with respect to the direction of rotation of the sprocket 10, a following side 32, FIGS. 3a-3d and 4a-4e, facing backwards with respect to the same direction of rotation, a front side 33, FIGS. 3a-3d, on the front face 11 of the sprocket 10, and a rear side 34, FIGS. 4a-4e, on the rear face 12 of the sprocket 10. The lead and following sides 31 and 32 are curved at the top and jointed to form vertex 35 of the tooth 13. Near to the vertex 35, the front and rear sides 33 and 34 are provided with respective bevels 36 and 37, FIGS. 4a-4d, converging towards vertex 35 to form the triangular bevel 36 of the tooth 13.

Each space 14 is defined by the sides 31 and 32 of the two adjacent teeth 13; such sides 31 and 32 are curved at the bottom and jointed to form a base 41 of the space 14.

The distance in the circumferential direction between the lead side 31 and following side 32 of a tooth 13 defines the width W of the tooth itself. Such a width clearly decreases from the base to the vertex 35 of the tooth 13. Conventionally, the width of the tooth is considered to be the distance measured by the position of the axis C of a chain engaged with the sprocket.

The distance in the radial direction between the base 41 of a space 14 and the vertex 35 of a tooth 13 defines the height of the tooth itself. The distance in the axial direction between the two front and rear sides 33 and 34 of a tooth 13 defines the thickness of the tooth itself.

Figures 5A, 5B, 5C:
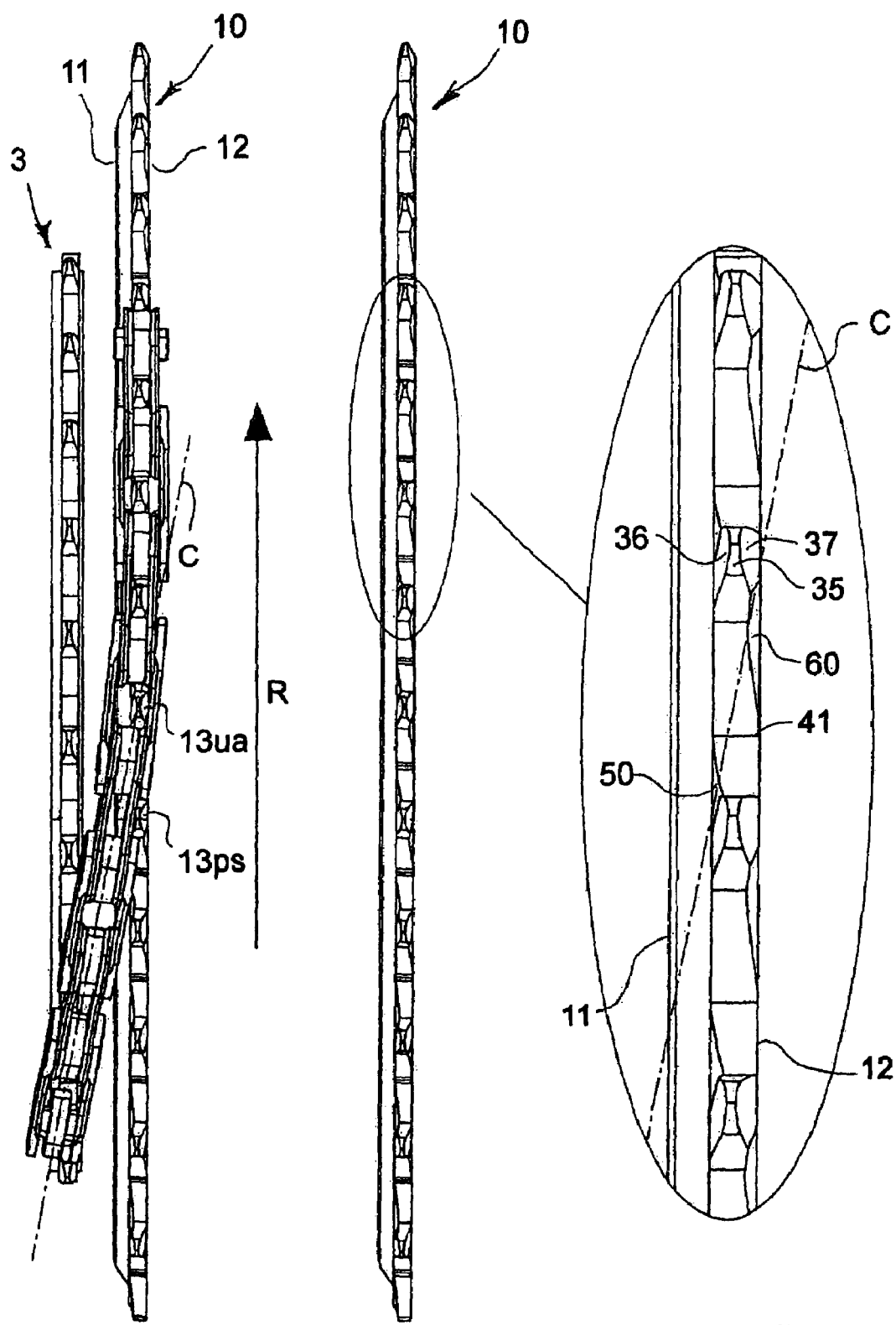

Referring to FIGS. 5a-5c, the sprocket 10 comprises, according to the invention, a front bevel 50 positioned on at least one tooth of first disengagement 13ps and a rear bevel 60 positioned on at least one tooth of last engagement 13ua; the front bevel 50 extends between the front side 33 and the lead side 31 of the tooth 13ps, whereas the rear bevel 60 extends between the rear side 34 and the following side 32 of the tooth 13ua. By the term "tooth of first disengagement," it is meant to underline the fact that such a tooth 13ps is the first of the teeth 13 to disengage from the chain 2 during a downwards gear-change; similarly, by the term "tooth of last engagement," it is meant to underline the fact that such a tooth 13ua is the last of the teeth 13 to remain engaged with the chain 2 during a downwards gear-change. What happens during a downwards gear-change shall be further described hereafter.

In the illustrated preferred example, all of the teeth 13 are provided with both a front bevel 50 and a rear bevel 60. In other embodiments of the invention, which are preferred in particular circumstances, it can be foreseen that the sprocket 10 could have:

a) a single tooth of first disengagement 13ps, provided with a front bevel 50;

b) a single tooth of last engagement 13ua, provided with a rear bevel 60;

c) a single tooth of first disengagement 13ps, provided with a front bevel 50 and a single tooth of last engagement 13ua, provided with a rear bevel 60, wherein the tooth of last engagement 13ua is the one immediately preceding the tooth of first disengagement 13ps in the direction of rotation of the sprocket 10;

d) a plurality of teeth of first disengagement 13ps, provided with a front bevel 60;

e) a plurality of teeth of last engagement 13ua, provided with a rear bevel 60; or f) a plurality of pairs of teeth of first disengagement 13ps and of teeth of last engagement 13ua, each pair being as defined above in point c).

The front bevel 50 and the rear bevel 60 have a surface substantially parallel to the longitudinal axis C of the chain 2, when it is passing from engagement with the sprocket 10 to engagement with the smaller diameter sprocket 3 but is still engaged with the sprocket 10 on the tooth of last engagement 13ua but no longer on the tooth of first disengagement 13ps. Such a direction is illustrated in particular in FIGS. 5b and 5c.

The front bevel 50 and the rear bevel 60 can extend along the tooth 13ps or 13ua upon which they are formed, or else they can even extend longer. In the illustrated preferred example, the bevels 50 and 60 in the radial direction approach the jointing of the sides 32 and 33 at the vertex 35, and in the circumferential direction almost to the joining point of the sides 32 and 33 in the space 14.

The front bevel 50 and the rear bevel 60 can have different shapes. In the preferred embodiment of the illustrated example, they have a curvilinear progression and their surface is substantially cylindrical.

Figure 4F:
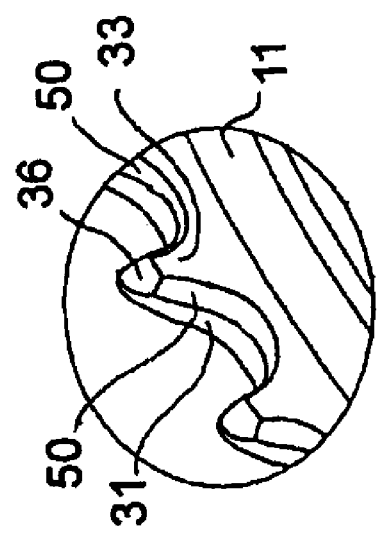
FIGS. 4f and 4g are alternate embodiments of the enlarged views shown in FIGS. 4b and 4d.
Figure 4G:
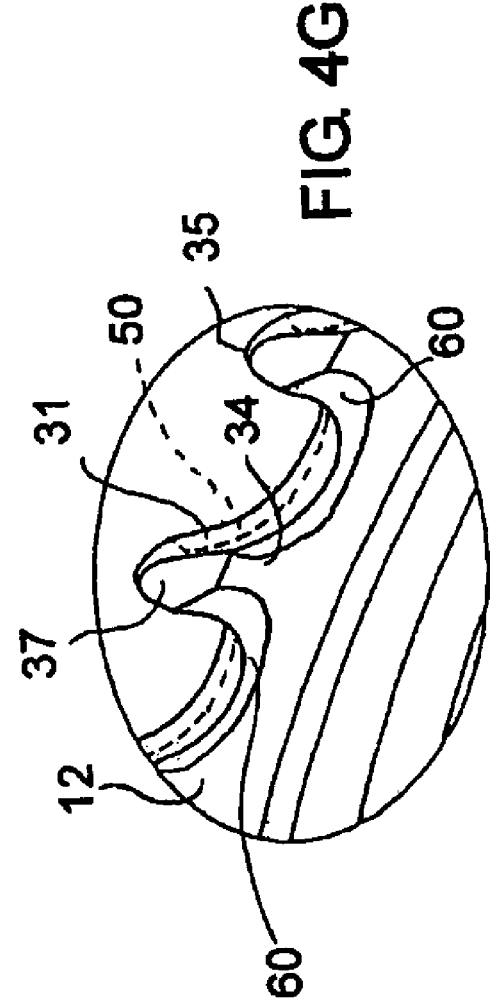
Figure 4H:
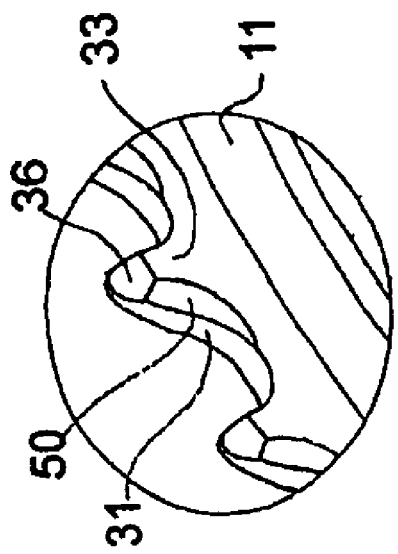
FIGS. 4h and 4i are alternate embodiments of the enlarged views shown in FIGS. 4b and 4d and show the front bevel extends further than the rear bevel.
Figure 4I:
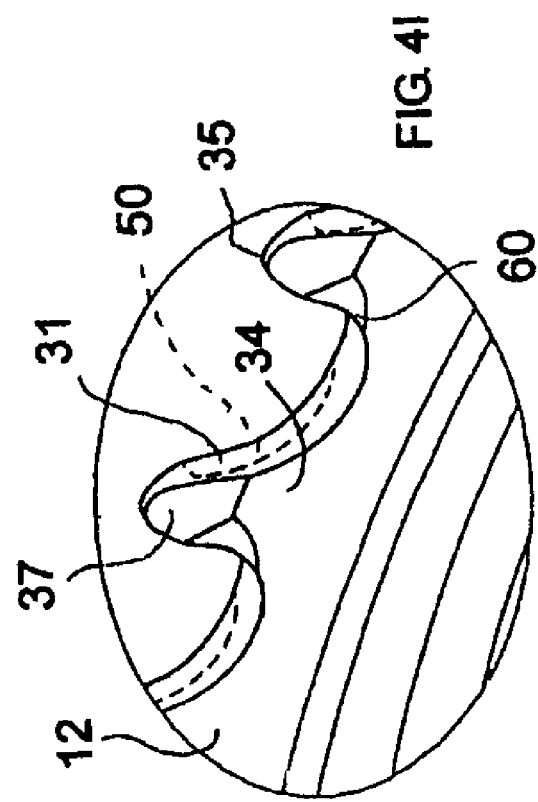

The front bevel 50 and the rear bevel 60 can extend along the tooth 13ps or 13ua upon which they are formed, or else they can even extend longer. In the illustrated preferred example, the bevels 50 and 60 in the radial direction approach the jointing of the sides 32 and 33 at the vertex 35, and in the circumferential direction almost to the joining point of the sides 32 and 33 in the space 14. As shown in FIGS. 4e and 4f, however, the bevels 50 and 60 can extend in the circumferential direction through substantially all of the space 14 in front of or behind the tooth 13, respectively. In the illustrated sprocket 10, the front bevels 50 and rear bevels 60 are all the same as each other. Alternatively the front bevels 50 may have a larger/longer extension than the rear bevels 60, as shown in FIGS. 4h and 4i.

In operation, the sprocket 10 engages with the chain 2 and rotates in the foreseen direction of rotation; the smaller diameter sprocket 3 is integral in rotation, therefore, it rotates in the same direction at the same speed.

For a downward gear-change, i.e. having to displace the engagement of the chain 2 from the sprocket 10 to the sprocket 3, the chain 2 itself is displaced transversally by known guide means (non-illustrated) towards the sprocket 3. Such a displacement tends to have the chain 2 disengage from the sprocket 10 and to then make it engage with the sprocket 3. However, the disengagement—as stated previously—is not easy; the presence of a tooth 13 with one of the bevels 50 or 60 eases such disengagement.

Indeed, as can be seen in FIGS. 2b and c and 5c, the rear bevel 60 allows the chain 2 (which is engaged with the tooth of last disengagement 13ua) to bend more before hitting the tooth 13ua with the inner face of the wide link 21. In turn, the front bevel 50 allows the adjacent narrow link 22 of the chain 2 to avoid interfere with the tooth of first disengagement 13ps. In other words, the presence of at least one of the bevels 50 and/or 60 creates mechanical conditions which ease the disengagement of the chain 2 from the sprocket 10. Such conditions can—as stated previously—be repeated on all teeth 13 of the sprocket 10 (as in the illustrated example) or kept in precise angular positions on the sprocket 10, where the downwards gear-change will take place.

What is claimed is:

1. Sprocket for engaging and disengaging a transmission chain as the chain moves between adjacent sprockets of different diameters, the sprocket comprising:
    a plurality of teeth that follow each other on the sprocket separated by spaces according to a direction of rotation of the sprocket, in which each tooth has a thickness, a width and a height and presents a lead side, a following side, a front side and a rear side;
    a front bevel on at least one tooth of first disengagement of said plurality of teeth, said front bevel extending between the front side and the lead side up to at most a base of a space in front of the tooth of first disengagement, no bevel portion being provided in a middle point of said space in front of the tooth of first disengagement; and
    a rear bevel on at least one tooth of last engagement of said plurality of teeth, said rear bevel extending between the rear side and the following side up to at most a base of a space behind the tooth of last engagement, no bevel portion being provided in a middle point of said space behind the tooth of last engagement; and
    wherein one of the front or rear bevels extends further than the other.

2. The sprocket of claim 1, wherein the front bevel has a surface facing substantially parallel to the longitudinal axis of the bicycle chain which is passing from engagement with the sprocket to engagement with the sprocket with a smaller diameter and which is still engaged with the sprocket on the tooth of last engagement but no longer on the tooth of first disengagement.

3. The sprocket of claim 1, wherein the rear bevel has a surface facing substantially parallel to the longitudinal axis of the bicycle chain which is passing from engagement with the sprocket to engagement with the sprocket with a smaller diameter and which is still engaged with the sprocket on the tooth of last engagement but no longer on the tooth of first disengagement.

4. The sprocket of claim 1 wherein the front bevel has a curvilinear progression.

5. The sprocket of claim 1 wherein the rear bevel has a curvilinear progression.

6. The sprocket of claim 1 wherein the front bevel has a linear progression with a joint, their surface having a substantially flat peripheral portion and a central joint portion.

7. The sprocket of claim 1 wherein the rear bevel has a linear progression with a joint, their surface having a substantially flat peripheral portion and a central joint portion.

8. Sprocket according to claim 1 wherein at least one of the front bevel or the rear bevel extend on the respective tooth in the radial direction for at least half the height of the tooth itself.

9. Sprocket according to claim 1 wherein at least one of the front bevel or the rear bevel extend on the respective tooth in the radial direction up to an upper triangular bevel of the tooth itself.

10. Sprocket according to claim 1 comprising a plurality of teeth provided with at least one of a front bevel or a rear bevel.

11. Sprocket according to claim 1 comprising both a tooth of first disengagement provided with the front bevel, and a tooth of last engagement provided with the rear bevel, the tooth of last engagement immediately preceding the tooth of first disengagement.

12. Sprocket according to claim 11, comprising a plurality of pairs of teeth of first disengagement and of last engagement.

13. Sprocket according to claim 1 wherein all of the teeth are provided both with a front bevel and a rear bevel.

14. Sprocket for engaging and disengaging a transmission chain as the chain moves between adjacent surockets of different diameters, the sprocket comprising:
    a plurality of teeth that follow each other on the sprocket separated by spaces according to a direction of rotation of the sprocket, in which each tooth has a thickness, a width and a height and presents a lead side, a following side, a front side and a rear side;
    a front bevel on at least a first tooth of said plurality of teeth, said front bevel extending between the front side and the lead side up to at most a base of the space in front of the first tooth, no bevel portion being provided in a middle point of said space in front of the first tooth; and
    a rear bevel on at least a second tooth of said plurality of teeth, said rear bevel extending between the rear side and the following side up to at most a base of the space behind the second tooth, no bevel portion being provided in a middle point of said space behind the second tooth; and
    wherein at least one of the front bevels extends further than the rear bevel.

15. A sprocket of a chain transmission for a bicycle comprising:
    a plurality of teeth that follow each other on the sprocket separated by spaces according to a direction of rotation of the sprocket, in which each tooth has a thickness, a width and a height and presents a lead side, a following side, a front side, and a rear side; and
    a front bevel on at least one tooth of first disengagement of the plurality of teeth, the front bevel extending between the front side and the lead side up to at most a base of the space in front of the tooth of first disengagement, no bevel portion being provided in a middle point of the space in front of the tooth of first disengagement.

16. The sprocket of claim 15, further comprising a rear bevel on at least one tooth of last engagement of the plurality of teeth, the rear bevel extending between the rear side and the following side up to at most a base of the space behind the tooth of last engagement, no bevel portion being provided in a middle point of the space behind the tooth of last engagement.

17. At least two bicycle transmission sprockets of different diameters that have a chain that moves between the at least two sprockets during gear-shifting, wherein the sprocket of larger diameter comprises:
    a plurality of teeth that follow each other on the sprocket separated by spaces according to a direction of rotation of the sprocket, in which each tooth has a thickness, a width and a height and presents a lead side, a following side, a front side and a rear side;

a front bevel on at least a first tooth of said plurality of teeth, said front bevel extending between the front side and the lead side up to at most a base of the space in front of the first tooth, no bevel portion being provided in a middle point of said space in front of the first tooth; and a rear bevel on at least a second tooth of said plurality of teeth, said rear bevel extending between the rear side and the following side up to at most a base of the space behind the second tooth, no bevel portion being provided in a middle point of said space behind the second tooth; and wherein one of the front or rear bevels extends further than the other.

18. A sprocket for engaging and disengaging a transmission chain as it moves between other sprockets of different diameters comprising:

a plurality of teeth that follow each other on the sprocket separated by spaces according to a direction of rotation of the sprocket, in which each tooth has a thickness, a width and a height, and presents a lead side, a following side, a front side, and a rear side; and a front bevel on at least one tooth of first disengagement of the plurality of teeth, the front bevel extending between the front side and the lead side up to at most a base of the space in front of the tooth of first disengagement, no bevel portion being provided in a middle point of the space in front of the tooth of first disengagement, and a rear bevel on at least one tooth of last engagement of the plurality of teeth, the rear bevel extending between the rear side and the following side up to at most a base of the space behind the tooth of last engagement, no bevel portion being provided in a middle point of the space behind the tooth of last engagement;

wherein one of the front or rear bevels has a greater surface area than the other.

19. A sprocket that engages and disengages a bicycle transmission chain as the chain moves between sprockets of different diameters, the sprocket comprising:

a plurality of successive teeth that are separated on the sprocket by spaces and each tooth has a thickness, a width, a height, a lead side, a following side, a front side and a rear side;

a predetermined front bevel on at least one tooth of first disengagement of said plurality of teeth, said front bevel extending between the front side and the lead side up to a base of the respective space in front of said tooth of first disengagement with there being no bevel portion provided in a middle point of said space in front of the tooth of first disengagement;

a predetermined rear bevel on at least one tooth of last engagement of said plurality of teeth, said rear bevel extending between said rear side and said following side up to a base of said space behind the tooth of last engagement with there being no bevel portion provided in a middle point of said space behind the tooth of last engagement; and wherein one of the front or rear bevels is larger than the other.

* * * * *